United States Patent [19]

Jones et al.

[11] 4,364,906

[45] Dec. 21, 1982

[54] METHOD FOR SELECTIVELY REMOVING FLUORINE AND FLUORINE-CONTAINING CONTAMINANTS FROM GASEOUS UF$_6$

[75] Inventors: Robert L. Jones, Paducah; Milton G. Otey, Melber; Roy W. Perkins, Mayfield, all of Ky.

[73] Assignee: The United States of America as represented by the United States Department of Energy, Washington, D.C.

[21] Appl. No.: 209,920

[22] Filed: Nov. 24, 1980

[51] Int. Cl.$^3$ ............... C01G 43/06; B01D 53/34
[52] U.S. Cl. .................................... 423/19; 423/6; 423/240; 423/241
[58] Field of Search ............ 423/6, 19, 240, 241, 423/258, 259; 55/71, 72

[56] References Cited

U.S. PATENT DOCUMENTS

| | | | |
|---|---|---|---|
| 3,125,409 | 3/1964 | Jury | 423/6 |
| 3,469,936 | 9/1969 | Chilenskas et al. | 423/240 |
| 3,625,661 | 12/1971 | Anderson et al. | 55/72 |
| 3,708,568 | 1/1973 | Golliher et al. | 423/6 |
| 4,292,287 | 9/1981 | Orlett et al. | 423/241 |

*Primary Examiner*—Earl C. Thomas
*Attorney, Agent, or Firm*—Fred O. Lewis; Stephen D. Hamel; Richard G. Besha

[57] ABSTRACT

This invention is a method for effecting preferential removal and immobilization of certain gaseous contaminants from gaseous UF$_6$. The contaminants include fluorine and fluorides which are more reactive with CaCO$_3$ than is UF$_6$. The method comprises contacting the contaminant-carrying UF$_6$ with particulate CaCO$_3$ at a temperature effecting reaction of the contaminant and the CaCO$_3$.

10 Claims, No Drawings

METHOD FOR SELECTIVELY REMOVING FLUORINE AND FLUORINE-CONTAINING CONTAMINANTS FROM GASEOUS UF₆

The invention is a result of a contract with the U.S. Department of Energy.

FIELD OF THE INVENTION

This invention relates to a method for the removal of fluorine and reactive fluorides from gas streams containing the same. More particularly, it relates to a process for removing gaseous fluorine and/or certain fluorides from a stream of gaseous $UF_6$ by passing the stream through a selected particulate trapping agent.

Problem

For many years, there has been a need for a practical method for the removal of gaseous $ClF_3$ and decomposition products thereof from gaseous $UF_6$ containing the same. This need has existed in facilities for the production of $UF_6$ feed for gaseous-diffusion operations, as well as in various research activities associated with $UF_6$. This need would be met satisfactorily by a relatively simple, dry process for selectively removing $ClF_3$, $ClF$, $ClO_2F$, and the like from streams of gaseous $UF_6$, but hitherto no such method has been available.

Related Art

U.S. Pat. No. 3,125,409 (S. H. Jury; Mar. 17, 1964) discloses the removal of $UF_6$ from gas mixtures containing the same by contacting the mixture with anhydrous calcium sulfate. U.S. Pat. No. 3,625,661 (L. W. Anderson et al; Dec. 7, 1971) discloses selectively removing titanium or niobium values from a gas mixture of $UF_6$, niobium pentafluoride, and titanium tetrafluoride by passing the mixture through a complex fluoride comprising an alkali metal cation and a complex fluoro anion. U.S. Pat. No. 3,708,568 (W. R. Golliher et al; Jan. 2, 1973) discloses selectively removing plutonium values from a fluid mixture containing $PuF_6$ and $UF_6$ by passing the mixture through a bed of pelletized cobaltous fluoride. The use of a limestone-packed tower to absorb HF from gases is described in the following article: N. Gilbert et al, *Chem. Engr. Progress*, 49, No. 3, pp. 120–127, March, 1953. The recovery of fluorine from stack gases by passing the gases through lump limestone is described by T. Hignett et al, *Ind. and Engr. Chem.*, 42, No. 11, pp. 2493–2498, November, 1979. The use of a limestone bed to remove halogen gases from air is described by R. Liimatainen et al, in Argonne National Laboratory Report ANL-5015, Apr. 1, 1953. The removal of various volatile metal fluorides from $UF_6$ by selective sorption on particulate $MgF_2$ and NaF is described by S. Smiley et al in *Trans. Am. Nucl. Soc.*, Vol. 10, No. 2, 1967, p. 507. Pelletized NaF commonly is used for preferentially trapping $UF_6$ from gas streams also containing other fluorides.

Objects

Accordingly, it is an object of this invention to provide a novel method for selectively removing fluorine and fluorine-containing compounds from gas streams also containing $UF_6$.

It is another object to provide a dry method for preferentially removing fluorine and fluorine-containing compounds from gas streams mainly comprising $UF_6$.

It is another object to provide a method for selectively removing contaminants such as fluorine-containing compounds from a gas stream also containing $UF_6$, the removed contaminant(s) being immobilized in non-volatile form.

SUMMARY

This invention is directed to a method for removing a gaseous contaminant such as fluorine and fluorides more reactive than $UF_6$ from a gas mixture containing the contaminants and $UF_6$. Removal is effected by contacting the mixture with particulate $CaCO_3$ at a temperature effecting reaction of the contaminant. The resulting purified gaseous $UF_6$ is recovered. The advantages of this method include the following: (1) the method utilizes dry chemistry; (2) the reaction zone can be defined by determining temperature profiles; (3) removal efficiency is relatively high; and (4) the $UF_6$ remains in the gas phase, with the exception that about 2–3 wt.% is retained as uranium on the bed material.

Additional objects, advantages, and novel features of the invention will be made evident hereinafter. The objects and advantages of the invention may be realized by practicing the method defined in the appended claims.

DETAILED DESCRIPTION OF THE INVENTION

This invention is based on a discovery made in the course of experiments which we conducted on the assumption that particulate $CaCO_3$ would prove to be an effective trapping agent for gaseous $UF_6$. Chemical-thermodynamic calculations indicate that these two compounds will react. Contrary to expectations, the experiments demonstrated that little reaction takes place between $CaCO_3$ and gaseous $UF_6$, even at temperatures as high as 1000° F. On the basis of this finding, we have developed a novel method for removing gaseous fluorine and certain gaseous fluorine-containing compounds from gaseous $UF_6$.

The following is an example of our method as conducted with particulate oolitic $CaCO_3$ as the reactant for effecting the removal of gaseous $ClF_3$ from a gas stream including gaseous $UF_6$. The $CaCO_3$ was limestone obtained from a Kentucky supplier (referred to herein as A).

EXAMPLE 1

In this run the gaseous feed stream consisted of $UF_6$, $ClF_3$, and inert-gas diluents, such as $N_2$. The gas stream was passed upwardly through a bed of particulate oolitic $CaCO_3$, confined in the central section of a vertically disposed Monel pipe. The inlet section of the pipe and the section containing the bed were provided with tube heaters. The bed had a weight of 1871 g, a diameter of 3" and a length of 12". The typical $CaCO_3$ particle was of irregular shape and measured $\frac{1}{2}"-\frac{1}{4}"$ screen fraction (USS, coarse series). Thermocouples were positioned in the bed at depths of 1", 6", and 11", as well as in the inlet section of the pipe. Conventional infrared analysis was used to determine the inlet and outlet concentrations of $ClF_3$. For about 15 hours before the run, the pipe heaters were energized to maintain a temperature of about 600° F., during which period dry air was passed through the bed. At the beginning of the run, the bed heaters were deenergized because of the exothermic nature of the reaction. The run was conducted until 100% breakthrough of $ClF_3$ occurred, to ensure that the entire bed would be reacted. The run is summarized in Table 1.

An analogous run was conducted in the same system with a fresh bed of the kind described in Example 1. In this additional run, the gaseous mixture fed to the above-described trap contained concentrations of $ClF_3$ as high as 9 mol%. $UF_6$ concentrations in the feed were typically between 70 and 80 mol% while the total mass flow to the trap was maintained at 0.13 lb/min. Maximum temperatures in the bed were below 825° F. and fluoride removal efficiencies remained at approximately 100% until the loading factor was approximately 22%. Analyses of the spent bed material indicated a total fluoride loading factor of 31%. The amount of uranium retained by the spent bed material was 2.6%. These runs confirmed that $CaCO_3$ beds are efficient means for trapping $ClF_3$ in the presence of $UF_6$, with minimal retention of the $UF_6$.

Additional runs were conducted to compare the performance of the $CaCO_3$ from Source A with the following: oolitic $CaCO_3$ from a Tennessee supplier (B) and an Illinois supplier (C); and non-oolitic $CaCO_3$ from another Kentucky supplier (D). Physical property measurements and analyses showed only minor differences in the four materials. Slight variations in impurity levels were noted; however, these do not appear to have any significant effect.

Table 2 summarizes the results of comparative runs conducted with the three oolitic materials and one non-oolitic material. The runs were made using a 1-in. OD by 14-in. long Monel reactor filled to a bed depth of 12 in. The total gas pressure in the system was maintained at 4 psia for the runs, with a superficial gas velocity of 2.4 ft/sec at 600° F. Each run was continued for about one hour after reaching approximately 100% $ClF_3$ breakthrough, to ensure complete reaction of the entire bed. Fluoride analyses of the bed materials were used to calculate total fluoride loading factors. Plots of efficiency with time were used to obtain breakthrough times and to calculate fluoride loading factors at breakthrough.

Maximum $ClF_3$ removal efficiencies prior to breakthrough, uranium retention on the bed material, and total fluoride loading factors were approximately the same for all three oolitic materials. For reasons which are not clear, the fluoride loadiing factor at breakthrough with the Source-B $CaCO_3$ is significantly lower than with the other two oolitic materials. In some applications, however, total fluoride loading would be a more important consideration.

Still referring to Table 2, two distinct differences in performance are apparent when comparing the non-oolitic and oolitic types. $ClF_3$ breakthrough occurred as soon as the run was started with the non-oolitic type. A maximum temperature rise of 64° F., due to the heat of reaction, was observed in the non-oolitic bed, whereas 138° F. to 193° F. was experienced with the oolitic beds. These runs show the non-oolitic $CaCO_3$ to be less reactive than the oolitic types; this can be an advantage in those selective-removal applications where very high removal efficiencies are not a necessity.

In some applications of our method, it is preferable to conduct the removal reaction in a moisture-free system in order to minimize loss of gaseous $UF_6$ by conversion to $UO_2F_2$ and to avoid deposition of the $UO_2F_2$ on the $CaCO_3$. The elimination of moisture may not be necessary when the $UF_6$ contains $ClF_3$, since the latter converts $UO_2F_2$ to gaseous $UF_6$.

For brevity, our method has been illustrated in terms of the selective removal of $ClF_3$ from gaseous mixtures containing $UF_6$, but it is also generally applicable to the removal of gaseous fluorine and gaseous fluorides which are more reactive with $CaCO_3$ than is $UF_6$. The following are additional examples of fluorides which we believe would be so removed: $ClF$, $ClOF_2$, $PuF_6$, $NpF_6$, $TcF_6$, $VOF_3$, $RuF_5$, $MoF_6$, and chromium fluorides. Given the teaching herein, one versed in the art can determine the applicability of our method with respect to other fluoride contaminants by means of only routine experimentation. The method also is applicable to the removal of HF from gaseous $UF_6$ if the gas mixture also includes an agent (e.g., $ClF_3$) for decomposing the water produced by the reaction of HF and $CaCO_3$.

Our method is effective over a wide range of elevated temperatures. For instance, preferential removal of $ClF_3$ from gaseous mixtures of $ClF_3$ and $UF_6$ will take place to some degree over a temperature range of from about 300° F. to at least 1200° F. (At temperatures below about 300° F., the extent of contaminant removal is undesirably low, whereas at about 1200° F. the amount of uranium retained on the bed approaches 25%). Preferably, the gas mixture to be purified is contacted with the reactant at a temperature in the range of from about 400° to 1100° F. More preferably, the range is from about 500° to 1000° F. In general, we prefer to conduct our method with superficial gas velocities of from about 0.2 to 2.5 ft/sec; in the system referred to in Examples 1 and 2, acceptable results were obtained at superficial velocities of from 0.4 to 5 ft/sec. It was noted that the progress of the reaction zone through the bed could be followed by measuring the temperature profile of the bed.

Our method has been illustrated above in terms of particular varieties of $CaCO_3$, but these are not necessarily the optimum. Given the teachings herein, one versed in the art can determine the most suitable varieties, particle sizes, shapes, etc., for a given application with only routine experimentation. Although the method has been illustrated in terms of fixed beds of $CaCO_3$, it is within the scope of the invention to use fluidized beds, if desired.

It will be apparent from the foregoing that our method meets the need discussed above under "Background of the Invention" The method is simple, reliable, and avoids the shortcomings of wet-chemistry processes. The selectively removed fluorine or fluorine-containing contaminants are immobilized in nonvolatile and easily stored form. The sorbent is a readily available and relatively inexpensive material. Furthermore, the method can be conducted in compact apparatus.

We do not wish to be bound by any theory as to the mechanism by which our method effects selective trapping of the above-mentioned contaminants while removing only minimal amounts of $UF_6$. X-ray analysis of $CaCO_3$ granules which have been used in accordance with this invention shows that they typically include the following: (a) an outer white layer of $CaF_2$; (b) an intermediate orange layer, rich in uranium; and (c) an internal gray core of unreacted $CaCO_3$. The gas-solid, displacement-type reaction probably is limited kinetically by penetration of the particle or diffusion through the $CaF_2$ reaction-product coating.

The foregoing description of a preferred embodiment of the invention has been presented for the purposes of illustration and description. It is not intended to be exhaustive or to limit the invention to the precise form disclosed, and obviously many modifications and variations are possible in light of the above teaching. It is intended that the scope of the invention be defined by the claims appended hereto.

TABLE 1
SELECTIVE REMOVAL OF $ClF_3$ FROM $UF_6$ WITH OOLITIC $CaCO_3$ (SUPPLIER A)

Pilot Test Run Number 1

| | |
|---|---|
| Total Gas Flow, lbs/min | 0.13 to 0.17 |
| Average Inlet $ClF_3$ Conc., Mol % | 2 to 3.7 |
| Average Inlet $UF_6$ Conc., Mol % | 70 to 80 |
| Initial Bed Temperature, °F. | 550 to 650 |
| Maximum Temperature Rise, °F. | 170 |
| Maximum $ClF_3$ Removal Efficiency* prior to Breakthrough, % | approx. 100 |
| $F^-$ Loading Factor** @ Breakthrough, % | approx. 13 |
| Total $F^-$ Loading Factor,** % | 22 |
| Uranium Retention, % | 3 |

\* $\frac{\text{Inlet Conc.} - \text{Outlet Conc.}}{\text{Inlet Conc.}} \times 100$ \*\* $\frac{g\ F^-}{g\ \text{initial CaCO}_3} \times 100$

TABLE 2
SELECTIVE REMOVAL OF $ClF_3$ FROM $UF_6$ WITH $CaCO_3$ MATERIALS

| | Supplier: | | | |
|---|---|---|---|---|
| | Oolitic $CaCO_3$ | | | Non-Oolitic $CaCO_3$ |
| | A | B | C | D |
| Run Number | 57 | 75 | 66 | 74 |
| Total Gas Flow, Sccm | 2,300 | 2,300 | 2,300 | 2,300 |
| Average Inlet $ClF_3$ Conc., Mol % | 9.0 | 7.3 | 8.9 | 6.8 |
| Average Inlet $UF_6$ Conc., Mol % | 6.5 | 3.1 | 5.8 | 9.0 |
| Bed Temperature, °F. | 600 | 600 | 600 | 600 |
| Maximum Temperature Rise, °F. | 173 | 138 | 193 | 64 |
| Maximum $ClF_3$ Removal Efficiency* prior to Breakthrough, % | >99.4 | >98.6 | >99.6 | Instant Breakthrough |
| $F^-$ Loading Factor** @ Breakthrough, % | 22 | 12 | 19 | Instant Breakthrough |
| Total $F^-$ Loading Factor,** % | 32 | 36 | 35 | 28 |
| Uranium Retention, % | 1.8 | 1.6 | 1.5 | 2.0 |

\* $\frac{\text{Inlet Conc.} - \text{Outlet Conc.}}{\text{Inlet Conc.}} \times 100$ \*\* $\frac{g\ F^-}{g\ \text{initial CaCO}_3} \times 100$

What is claimed is:

1. The method of treating a gaseous mixture of $UF_6$ and a contaminant selected from the group consisting of fluorine and gaseous fluorides which are more reactive with $CaCO_3$ than is $UF_6$, to effect selective removal of said contaminant from said mixture, comprising:
   contacting said mixture with particulate $CaCO_3$ at a temperature effecting reaction of said contaminant and said $CaCO_3$, and
   recovering the resulting purified gaseous $UF_6$.

2. The method of claim 1 wherein said $CaCO_3$ is at a temperature in the range of from about 300° to 1200° F.

3. The method of selectively removing a gaseous contaminant selected from the group consisting of $F_2$, $ClF_3$, $ClF$, $ClO_2F$, $PuF_6$, $NpF_6$, $TcF_6$, $VF_5$, $VOF_3$, $RuF_5$, $MoF_6$, and chromium fluorides from a stream of gaseous $UF_6$ containing said contaminant, said method comprising:
   passing said stream through a bed of particulate $CaCO_3$ at a temperature effecting reaction of said contaminant and said bed.

4. The method of claim 3 wherein said bed is substantially free from moisture.

5. The method of claim 3 wherein said bed is at a temperature in the range of from about 300° to 1200° F.

6. The method of claim 5 wherein said bed is at a temperature in the range of from about 400° to 1000° F.

7. The method of claim 3 wherein the superficial velocity of said stream is in the range of from about 0.4 to 5 sec.

8. The method of selectively removing a gaseous contaminant selected from the group consisting of $F_2$, metal fluorides, $ClF_3$, $ClF$, $ClO_2F$, and $VOF_3$ from a stream of gaseous $UF_6$ containing said contaminant, comprising:
   providing a substantially moisture-free bed of particulate $CaCO_3$, heating said bed to a temperature in the range of from about 300° to 1200° F., and
   passing said stream through said bed at a flow rate providing a residence-time in said bed of from about 0.4 to 5 ft/sec.

9. The method of selectively removing HF from a gaseous stream containing HF and $UF_6$, comprising:
   passing said stream through a bed of $CaCO_3$ at a temperature effecting reaction of said HF and said $CaCO_3$, said stream also having incorporated therein a gaseous agent for decomposing water formed as a byproduct of said reaction.

10. The method of claim 9 wherein said agent is $ClF_3$.

* * * * *